March 27, 1934.  P. KIRSCH  1,952,990
FISHMOUTH SPREADER
Filed Sept. 12, 1932
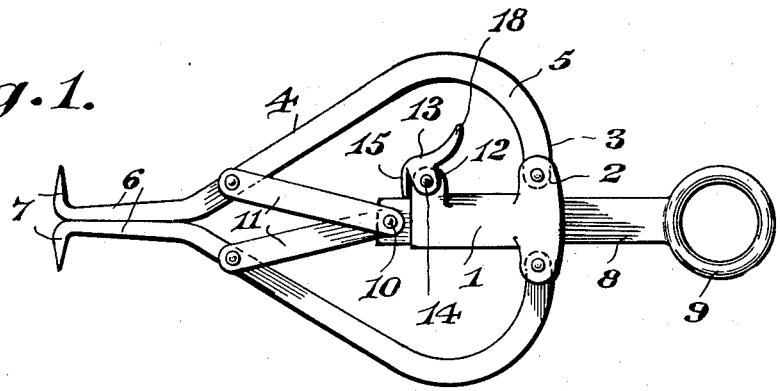
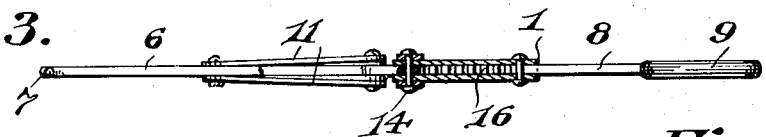
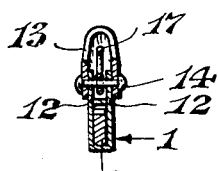 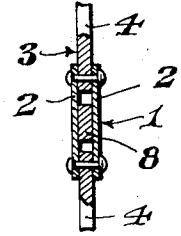 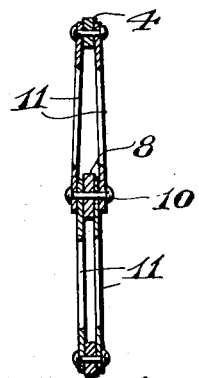
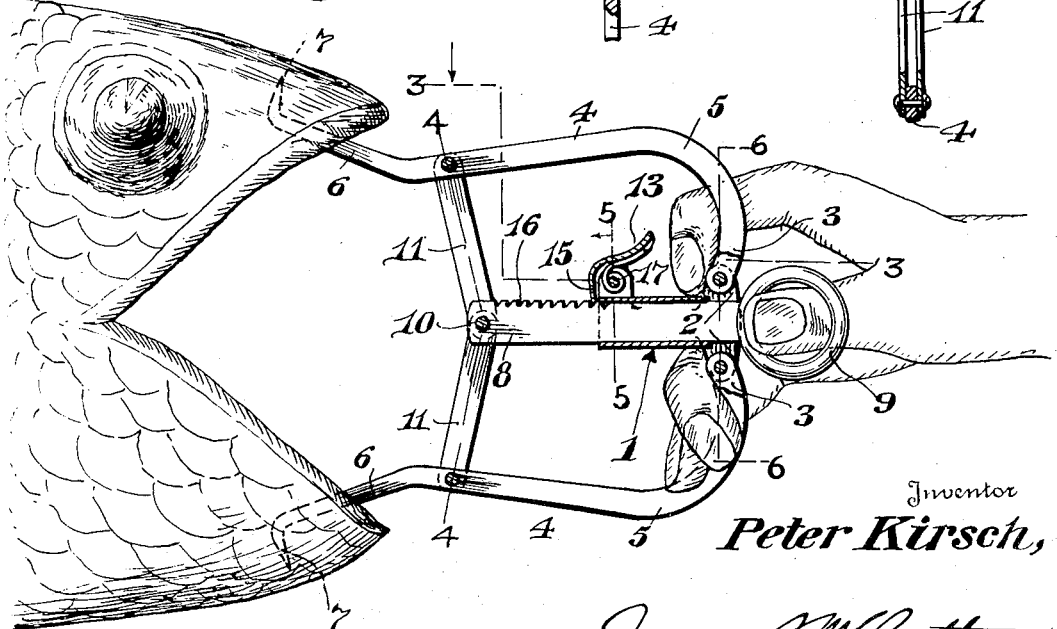
Inventor
Peter Kirsch,
By Irving R. M?Cattran
Attorney Patented Mar. 27, 1934

1,952,990

UNITED STATES PATENT OFFICE 1,952,990

FISHMOUTH SPREADER

Peter Kirsch, Decatur, Ind.

Application September 12, 1932, Serial No. 632,848

3 Claims. (Cl. 43—29)

This invention relates to fish mouth spreaders and has for its object the production of a simple and efficient spreader of the type which may be efficiently and conveniently operated for engaging and spreading the mouth of a fish without danger of the fish biting or otherwise injuring the hand of the operator.

Another object of this invention is the production of a simple and efficient fish mouth spreader, the spreading jaws of which are so mounted as to be conveniently gripped by the fingers of the operator at their inner ends so as to permit the outer ends of the jaws which carry the spurs to be efficiently spread without bringing the hand in close proximity to the mouth of the fish.

A further object of this invention is the production of a simple and efficient fish mouth spreader which consists of a minimum number of parts, is positive in operation, and which will efficiently spread the mouth of the fish so as to facilitate the removal of the fish hook.

With these and other objects in view, this invention consists in certain novel constructions, combinations and arrangements of parts as will be hereinafter described and claimed.

In the drawing:

Figure 1 is a side elevation of the fish mouth spreader in a closed or retracted position;

Figure 2 is a side elevation of the fish mouth spreader in a spread and operating position, certain parts thereof being shown in longitudinal section;

Figure 3 is a section taken on line 3—3 of Figure 2;

Figure 4 is a section taken on line 4—4 of Figure 2;

Figure 5 is a section taken on line 5—5 of Figure 2; and

Figure 6 is a section taken on line 6—6 of Figure 2.

By referring to the drawing, it will be seen that 1 designates the shank of the fish mouth spreader which comprises a substantially rectangular tubular body having laterally extending ears 2 at the inner end thereof between which ears 2 are pivotally mounted the inner ends 3 of the spreading jaws 4. These jaws 4 are provided with enlarged curved rear ends 5 located near the pivotal connection between the jaws 4 and the ears 2, as clearly shown in Figures 1 and 2 of the device. Each jaw 4 terminates in a forwardly extending shank 6, each shank 6 terminating in a laterally extending spur 7.

A longitudinally movable and sliding rack bar 8 is mounted within the shank 1 and is provided with an enlarged thumb receiving eye 9 at its inner end. The forward end of the rack bar 8 carries a pin 10, which pin passes through the bracing links 11, which links 11 are arranged in pairs as illustrated in the drawing, one pair of the links engaging one jaw 4, and the other pin engaging the companion jaw 4. The links are arranged in pairs as above stated, the links being secured to the opposite faces of the jaws and the opposite faces of the rack bar 8 as clearly shown in Figure 4.

The shank 1 is provided near its forward end with upstanding ears 12 over which ears 12 is arranged in straddling relation, a pawl 13, which pawl 13 is pivotally secured to the ears 12 by means of a pivot pin 14. The pawl 13 is provided with a downwardly bent tongue 15 which is adapted to engage the rack teeth 16 of the rack bar 8. A coil spring 17 is wound about the pivot pin 14 and engages under the thumb piece 18 of the pawl 13 for normally causing the tongue 15 to fit into releasable engagement with the rack teeth 16 of the bar 8.

In operation, after the fish has been caught, it is pulled to the side of the boat or to the shore, and the operator will place his thumb through the ring or eye 9, his first finger around one of the enlarged curved rear ends 5 of one of the jaws 4, and his second finger over and around the enlarged end of the other curved jaw 4, such as is illustrated in Figure 2. The shanks 6 are then forced into the mouth of the fish and by pulling rearwardly upon the enlarged curved rear ends 5 of the jaws 4, the jaws will be caused to spread apart at their outer ends thereby forcing the spurs 7 into the mouth of the fish. The riding of the pawl 13 over the rack teeth 16 will permit the bar 8 to slide through the shank 1 and hold this bar 8 in an adjusted position, thereby holding the jaws 4 in their spread or open position, these jaws being braced by the links 11, as shown in Figure 2. The hook which has caught the fish may then be easily removed and when it is desired to remove the spreader from the mouth of the fish, the pawl 13 may be released from the rack bar 8 and the jaws 4 swung to a closed position, such as is shown in Figure 1.

If it is desired, the eye 9 may be used for the purpose of hanging the fish mouth spreader upon a nail, hook, or other support, while the spreader is in an open or closed position.

It should be understood that certain detail changes in the mechanical construction, combination and arrangement of parts may be employed without departing from the spirit of the invention, so long as these changes fall within the scope of the appended claims.

Having described the invention, what is claimed as new is:—

1. A fish mouth spreader of the class described comprising a shank, spreading jaws pivotally secured near one end of said shank, and having enlarged curved rear ends to provide finger-engaging portions whereby the pull of the fingers on said enlarged rear curved ends will spread said jaws, spurs carried by the outer ends of said jaws, and bracing means for holding said jaws in an adjusted position.

2. A fish mouth spreader of the class described comprising a shank, jaws pivotally secured near one end of said shank and provided with forwardly extending ends having laterally extending spurs, a rack bar slidably mounted through said shank, links pivotally connected to said rack bar and engaging said jaws for bracing said jaws in an open position, a spring pressed pawl engaging said rack bar for locking the same in a released adjusted position, said jaws having enlarged curved finger-receiving rear ends, a thumb-receiving eye carried by said rack bar, and said eye and enlarged curved rear ends being adapted to facilitate the opening of said jaws when engaged by the fingers and thumb of an operator's hand whereby said jaws may be spread to an open position without the necessity of the operator placing his hand in the mouth of the fish.

3. A fish mouth spreader of the class described comprising a shank, jaws pivotally secured to the rear end of said shank, said jaws having finger engaging portions near their rear ends, a rack bar slidably mounted through said shank, bracing links pivotally secured at their inner ends to the forward end of said bar and pivotally secured near their forward ends to said jaws, the jaws being adapted to slide said shank in one direction upon said rack bar as pressure is brought to bear upon the finger engaging portions thereof, and means for locking said rack bar in an adjusted position.

PETER KIRSCH.